United States Patent [19]
Hoyt et al.

[11] Patent Number: 5,577,217
[45] Date of Patent: Nov. 19, 1996

[54] METHOD AND APPARATUS FOR A BRANCH TARGET BUFFER WITH SHARED BRANCH PATTERN TABLES FOR ASSOCIATED BRANCH PREDICTIONS

[75] Inventors: Bradley D. Hoyt; Subramanian Natarajan, both of Portland, Oreg.

[73] Assignee: Intel Corporation, Santa Clara, Calif.

[21] Appl. No.: 646,058

[22] Filed: May 7, 1996

Related U.S. Application Data

[63] Continuation of Ser. No. 314,936, Sep. 29, 1994, abandoned, which is a continuation of Ser. No. 62,057, May 14, 1993, abandoned.

[51] Int. Cl.$^6$ ............................ G06F 9/22; G06F 9/26; G06F 9/38
[52] U.S. Cl. ................ 395/376; 395/690; 395/182.03; 395/467
[58] Field of Search ........................ 395/375, 182.8, 395/700

[56] References Cited

U.S. PATENT DOCUMENTS

| | | | |
|---|---|---|---|
| 4,477,872 | 10/1984 | Losq et al. | 364/200 |
| 4,679,141 | 7/1987 | Pomerene et al. | 395/375 |
| 4,763,245 | 8/1988 | Emma et al. | 395/375 |
| 5,142,634 | 8/1992 | Fibe et al. | 395/375 |
| 5,155,843 | 10/1992 | Stamm et al. | 375/575 |
| 5,163,140 | 11/1992 | Stiles et al. | 395/425 |
| 5,226,130 | 7/1993 | Favor et al. | 395/375 |
| 5,237,666 | 8/1993 | Suzuki et al. | 395/375 |
| 5,265,213 | 11/1993 | Weiser et al. | 395/375 |
| 5,276,882 | 1/1994 | Emma et al. | 395/700 |
| 5,313,134 | 5/1994 | Eickemeyer | 395/700 |
| 5,423,011 | 6/1995 | Blaner et al. | 395/375 |
| 5,507,028 | 4/1996 | Liu | 395/375 |

OTHER PUBLICATIONS

Superscalar Microprocessor Design; author: Mike Johnson; Published by Prentice Hall, Inc., New Jersey, 1991; pp. 57–85 and 261–272.

IEEE Micro, Published Jun., 1991, pp. 10–13, and 63–73, Authors: Val Popescu, et al., Entitled: The Metaflow Architecture.

"Alternative Implementations of Two–Level Adaptive Branch Prediction", by Tse–Yu Yeh & Yale N. Patt (pp. 124–134) published 1992 by ACM.

"Branch Prediction Strategies and Branch Target Buffer Design", by Johnny K. F. Lee & Alan J. Smith (pp. 6–22) published 1984 by Computer.

"Improving the Accuracy of Dynamic Branch Prediction Using Branch Correlation", by Shien–Tai Pan, Kimming So & Joseph T. Rahmeh (pp. 76–84) published 1992 by ACM.

"Two–Level Adaptive Training Branch Prediction", by Tse–Yu Yeh & Yale N. Patt (pp. 51–61) published 1991 by ACM.

*Primary Examiner*—Krisna Lim
*Assistant Examiner*—Saleh Najjar
*Attorney, Agent, or Firm*—Blakely, Sokoloff, Taylor & Zafman

[57] ABSTRACT

A two level adaptive branch prediction mechanism for a computer processor. The branch prediction mechanism comprises a branch target buffer in which the branch prediction entries are partitioned into "sets" of branch prediction entries. Each set of branch prediction entries is provided with a branch pattern table such that only the branch prediction entries in the same set share a branch pattern table thereby reducing branch pattern table interference.

10 Claims, 10 Drawing Sheets

| Branch Pattern | Branch Pattern History |
|---|---|
| 0000 | 00 |
| 0001 | 01 |
| 0010 | 00 |
| 0011 | 11 |
| 0100 | 00 |
| 0101 | 01 |
| 0110 | 10 |
| 0111 | 00 |
| 1000 | 01 |
| 1001 | 01 |
| 1010 | 11 |
| 1011 | 00 |
| 1100 | 11 |
| 1101 | 10 |
| 1110 | 00 |
| 1111 | 11 |

Branch History

NTTN (0110) —Index→ 0110

*Figure 1*

| BRANCH ENTRY 1 | BRANCH ENTRY 2 | BRANCH ENTRY 3 | BRANCH ENTRY 4 |
|---|---|---|---|

BTB ENTRY

*Figure 8a*

| VALID BIT | SET ADDR TAG | OFF SET IN BLOCK | TARGET TAG | BRANCH HISTORY | PRECALCULATED PREDICTION BIT | MISCELLANEOUS BITS |
|---|---|---|---|---|---|---|

BRANCH ENTRY

| BRANCH ENTRY 1 | BRANCH ENTRY 2 | BRANCH ENTRY 3 | BRANCH ENTRY 4 | BRANCH SET PATTERN TABLE |
|---|---|---|---|---|

METHOD AND APPARATUS FOR A BRANCH TARGET BUFFER WITH SHARED BRANCH PATTERN TABLES FOR ASSOCIATED BRANCH PREDICTIONS

This is a continuation of application Ser. No. 08/314,936, filed Sep. 29, 1994, now abandoned which is a continuation of application Ser. No. 08/062,057, filed May 14, 1993, now abandoned.

BACKGROUND OF THE INVENTION

1. Field of the Invention

This invention relates to dynamic branch prediction mechanisms for microprocessors. More specifically to a branch target buffer wherein the branch prediction entries are divided into sets and each set of branch prediction entries shares a branch pattern table.

2. Art Background

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waits until all the previous logic blocks complete operations before beginning its operation.

To improve microprocessor efficiency, microprocessor designers overlapped the operations of the fetch, decode, execute, and writeback stages such that the microprocessor operated on several instructions simultaneously. In operation, the fetch, decode, execute, and writeback stages concurrently process different instructions. At each clock tick the results of each processing stage are passed to the following processing stage. Microprocessors that use the technique of overlapping the fetch, decode, execute, and writeback stages are known as "pipelined" microprocessors.

In order for a pipelined microprocessor to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instructions until the condition is resolved. Since the condition will not be resolved until further down the pipeline, the instruction fetch unit cannot fetch the proper instructions.

To alleviate this problem, many pipelined microprocessors use branch prediction mechanisms that predict the outcome of branches, and then fetch subsequent instructions according to the branch prediction. To predict the outcome of branch instructions, most branch prediction mechanisms collect branch "histories" that store the outcome of the last K occurrences of each branch.

The Yeh & Patt prediction mechanism dynamically maintains two levels of branch history. The first level of branch history maintained is the branch outcome of the last k occurrences of a particular branch. The first level of branch history is stored in a branch target buffer along with a tag address and a target address. The second level of branch history maintained is the outcome of branches that have a particular branch history pattern provided by the first level. The second level of branch history is stored in a pattern table such that the first level of branch history is used to index into the pattern table.

In the November 1991 paper, Yeh & Patt suggested using a single global pattern table that is used by all the entries in the branch target buffer. Since the single global pattern table is shared by all the entries in the branch target buffer, the different branches create interference. The branch interference tends to reduce the accuracy of the branch predictions.

In a later paper, Yeh & Patt suggested providing a branch pattern table for each branch prediction entry in the branch target buffer. (See Tse Yu Yeh and Yale. N. Patt, *Alternative Implementations of Two-Level Adaptive Branch Prediction*, Proceedings of the 19th International Symposium on Computer Architecture, May 1992, pp. 124–134) Providing an individual branch pattern table for each branch prediction entry completely removes the pattern table interference and thereby improves the branch prediction accuracy. However providing a branch pattern table for each branch prediction entry in the branch target buffer greatly increases the hardware implementation cost.

SUMMARY OF THE INVENTION

It is therefore an object of the present invention to provide a branch target buffer that reduces the amount of branch pattern table interference without greatly increasing the hardware implementation cost.

These and other objectives are accomplished by the branch target buffer architecture of the present invention that partitions the branch prediction entries in the branch target buffer into "sets" of branch prediction entries. Each set of branch prediction entries is provided with a branch pattern table such that only the branch prediction entries in the same set share a branch pattern table.

BRIEF DESCRIPTION OF THE DRAWINGS

The objects, features and advantages of the present invention will be apparent to one skilled in the art, in view of the following detailed description in which:

FIG. 1 is an illustration of the two levels of branch history kept by the Yeh & Patt branch prediction mechanism.

FIG. 8a is a block diagram of a branch target buffer entry for a branch target buffer wherein each line contains a set of branch predictions.

FIG. 8b is a block diagram of the information stored within each branch prediction for the branch target buffer system disclosed in FIG. 8a.

FIG. 9 is a block diagram of a branch target buffer wherein each line contains a set of branch predictions and a branch pattern table concatenated onto each set of branch predictions.

NOTATION AND NOMENCLATURE

Figure 2:
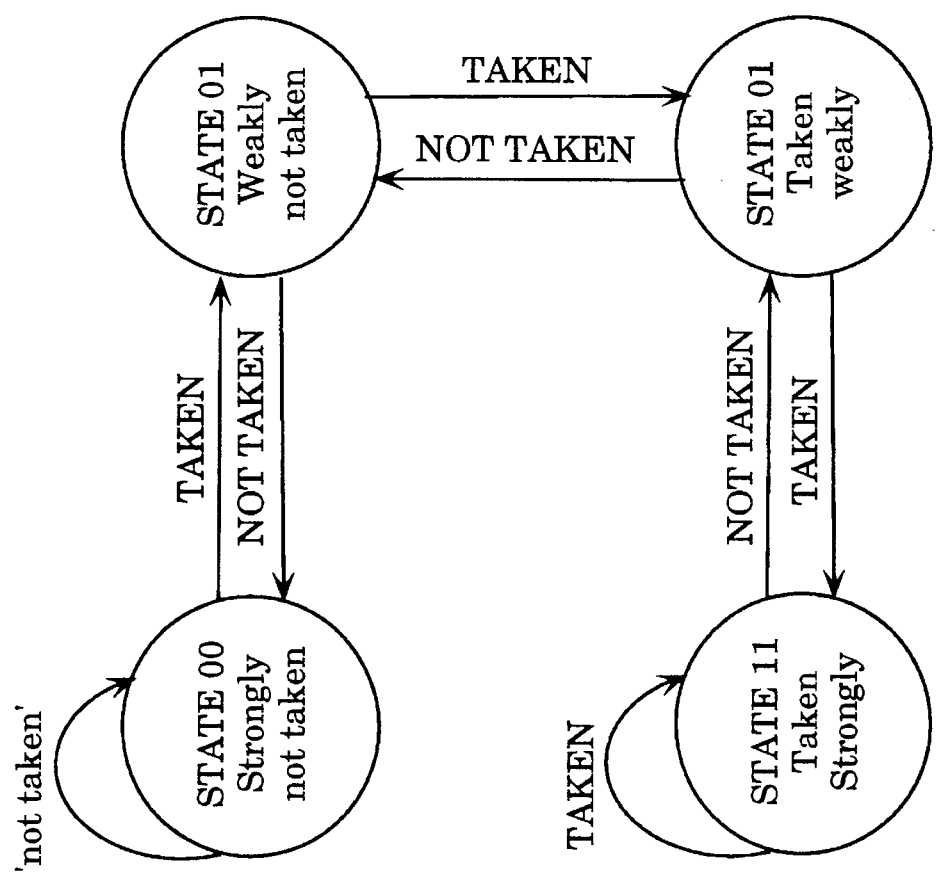
FIG. 2 is a state diagram used to maintain branch pattern history.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Intel Corporation, as well as other manufacturers of computer systems.

DETAILED DESCRIPTION OF THE INVENTION

A branch target buffer with a branch pattern history table for each clustered set of branch predictions is disclosed. In the following description, for purposes of explanation, specific nomenclature is set forth to provide a thorough understanding of the present invention. However, it will be apparent to one skilled in the art that these specific details are not required in order to practice the present invention. In other instances, well-known circuits and devices are shown in block diagram form in order not to obscure the present invention unnecessarily.

Two Level Adaptive Branch Prediction

To predict the outcome of branch instructions with a high degree of accuracy, Yeh & Patt introduced a two-level adaptive branch prediction mechanism. (See Tse Yu Yeh and Yale N. Patt, *Two-Level Adaptive Branch Prediction*, The 24th ACM/IEEE International Symposium and Workshop on Microarchitecture, November 1991, pp. 51–61) The two-level Yeh & Patt branch prediction mechanism dynamically maintains two levels of branch history.

The first level of branch history maintained in the two-level adaptive branch prediction mechanism is the branch history for each particular branch instruction. The branch history consists of k bits that represent whether a particular branch was taken or not taken during the last k occurrences of the branch. Concatenating the k branch history bits together creates a branch pattern. For example in FIG. 1, a "not-taken, taken, taken, not-taken" branch history is represented by a "0110" branch pattern.

The second level of branch history maintained in the two-level adaptive branch prediction mechanism is the branch pattern history. The branch pattern history indicates the likely outcome of a branch based upon the previous situations with identical branch histories. The branch pattern history is stored as a two-bit state value created from previous occurrences of the same branch pattern. The two-bit state value classifies branch patterns into strongly taken, weakly taken, weakly not-taken, and strongly not-taken as illustrated in FIG. 2. Each time a branch instruction is resolved, the branch pattern table is updated using the state transition arrows as illustrated in FIG. 2.

Referring again to the example of FIG. 1, 4 bits of branch history store a "not-taken, taken, taken, not-taken" pattern for the branch. The 4 bit branch pattern is used to index into a branch pattern table that stores branch pattern history state values for each branch pattern. In FIG. 1, the "0110" branch pattern indexes to a "10" state value that represents the "weakly taken" state. The branch prediction mechanism will therefore predict the branch will be taken.

When the branch condition is resolved, the branch prediction mechanism updates both the branch history for the branch and the appropriate state value entry in a branch pattern table. The branch pattern table is first updated by indexing into the branch pattern table with the branch history and changing the state value using latest branch result according to the state transition arrows as illustrated in FIG. 2. The branch history is subsequently updated by shifting the latest branch result into the branch history.

Branch Target Buffer with Global Pattern Table

Figure 3:
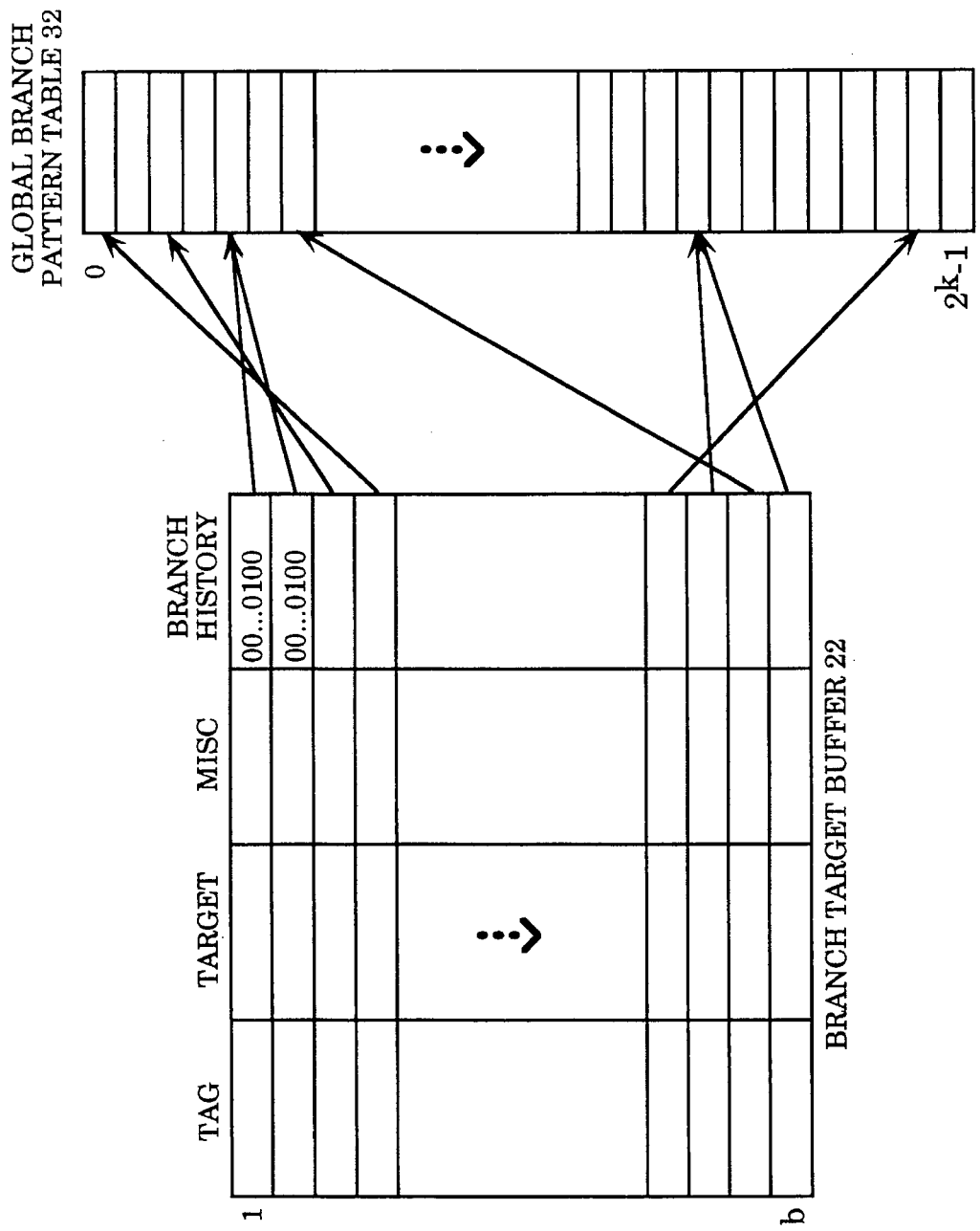
FIG. 3 is a block diagram of a branch prediction mechanism which uses a single global branch pattern table.

In a November 1991 paper, Yeh & Patt proposed a branch prediction mechanism consisting of a branch target buffer for storing a first level of branch history and a single global pattern table for storing a second level of branch history. The single global pattern table is shared by all the branch prediction entries in the branch target buffer. FIG. 3 illustrates a branch prediction mechanism with a branch target buffer 22 and a single global pattern table 32 shared by the b branch prediction entries in the branch target buffer 22. Each branch prediction entry in the branch target buffer 22 accesses the single global pattern table 32 by indexing into the global pattern table 32 using its own branch history.

Implementing the global pattern table 32 illustrated in FIG. 3 requires enough silicon die area for $2^k \times 2$ bits. The global pattern table 32 uses $2^k \times 2$ bits since the k history bits can produce $2^k$ different possible branch patterns and each entry in the global pattern table 32 is stored as a 2 bit state value.

Since the same global pattern table is used by every branch in the branch target buffer 22, there will be interference between different branches that have the same branch pattern. For example, the first two branch prediction entries in the branch target buffer 22 illustrated in FIG. 3 both have the same "00 ... 0100" branch pattern. Therefore, these two branch prediction entries will index into the same branch pattern entry in the global pattern table 32. If these two branches go in different directions (one is taken and the other is not-taken), then the branch prediction entries will interfere with one another creating an inaccurate branch pattern table entry. In future occurrences of the this branch pattern, at least one of the branches will be predicted incorrectly due to the interference.

One method of reducing the amount of interference in the global branch pattern table 32 and thereby improve branch prediction accuracy, is to increase the size of the global branch pattern table 32. To index into the enlarged global pattern table additional bits of branch history are required for each branch prediction entry in the branch target buffer 22. Although increasing the size of the global pattern table 32 reduces the amount of interference in the global branch pattern table 32, interference still occurs due to commonly occurring branch pattern histories.

Branch Target Buffer with Per Address Pattern Tables

In a later paper, Yeh &Patt suggested improving the accuracy of the prediction mechanism by providing a branch pattern table for each branch prediction entry in the branch target buffer. (See Tse Yu Yeh and Yale. N. Patt, *Alternative Implementations of Two-Level Adaptive Branch Prediction*, Proceedings of the 19th International Symposium on Computer Architecture, May 1992, pp. 124–134) Providing an individual branch pattern table for each branch prediction entry in the branch target buffer completely removes the pattern table interference. Therefore each branch prediction entry in the branch target buffer builds its own unique branch pattern history in its own branch pattern table. Each individual branch pattern history table accurately predicts the outcome of the branch based upon the branch's personalized branch pattern history.

Figure 4:
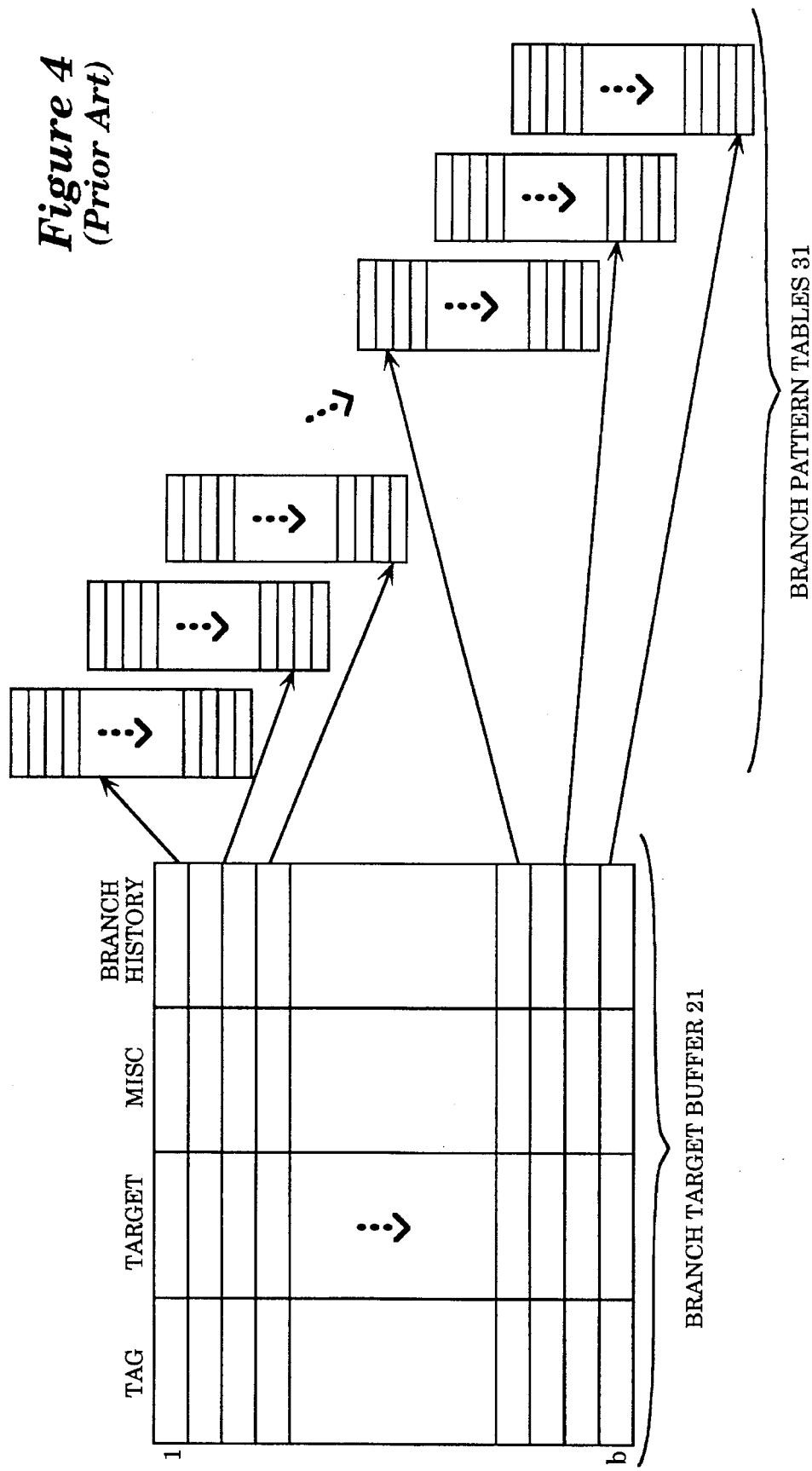
FIG. 4 is a block diagram of a branch prediction mechanism that provides a branch pattern table for each branch prediction entry in the branch target buffer.

FIG. 4 illustrates a branch prediction mechanism consisting of branch target buffer 21 with b branch prediction entries and b branch pattern tables 31 such that each branch prediction entry in the branch target buffer 21 has its own individual branch pattern table. In the branch target buffer 21 of FIG. 4 each branch prediction entry contains a tag address that identifies the location of the branch, a target address that indicates where the branch jumps to, a branch history, and other miscellaneous bits.

To access the individual pattern state table, each branch prediction entry in the branch target buffer 21 uses its branch history as an index into the branch pattern table. The state value retrieved from the branch pattern table predicts the outcome of the branch based upon the two levels of branch history collected.

The branch prediction mechanism illustrated in FIG. 4 that has a pattern table for each branch prediction entry in the branch target buffer 21 generates very accurate branch predictions. However, providing a branch pattern table 21 for each branch prediction entry in the branch target buffer greatly increases the hardware implementation cost. To implement the branch prediction mechanism illustrated in FIG. 4 in a microprocessor requires an increased amount of the silicon die area. Specifically, to implement the b pattern tables requires enough silicon die area for $b \times 2^k \times 2$ bits of state information.

Branch Target Buffer with per-set Pattern Tables

The present invention improves the branch prediction accuracy per hardware implementation cost by introducing a hybrid scheme. The hybrid scheme of the present invention combines aspects of both the global pattern table approach and the per address pattern table approach. In the hybrid scheme of the present invention the branch prediction entries in the branch target buffer are grouped into several "sets" of branch prediction entries. Each set of branch prediction entries in the branch target buffer is given a branch pattern table to share. Since only a small set of branch prediction entries share each branch pattern table, the pattern table interference is minimized, yet the hardware implementation cost of providing a branch pattern table for each branch prediction entry is avoided.

Figure 5:
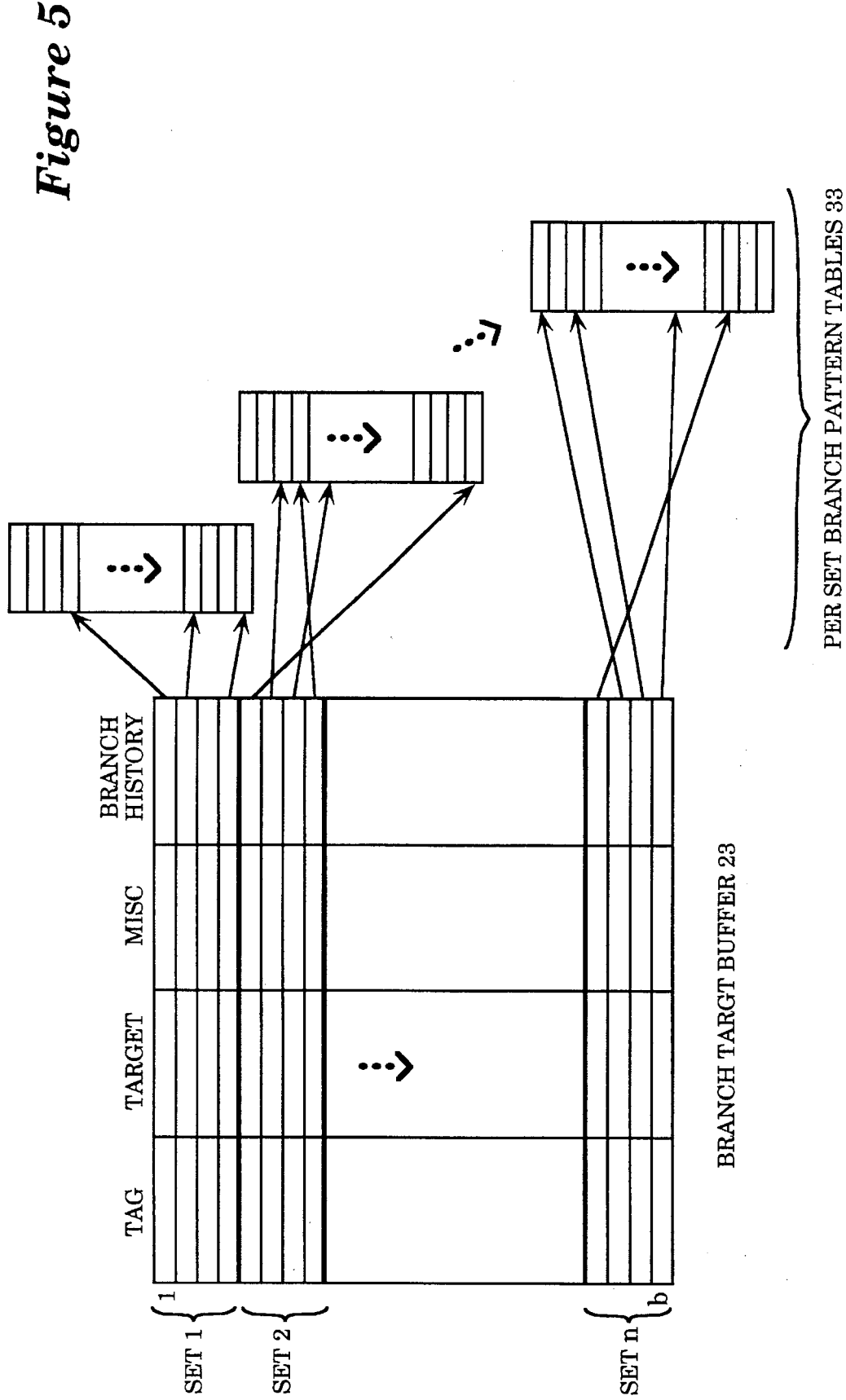
FIG. 5 is a block diagram of a branch prediction mechanism that divides the branch prediction entries in the branch target buffer into sets and provides a branch pattern table for each set of branch prediction entries.

FIG. 5 illustrates an example of a branch prediction mechanism utilizing the teachings of the present invention. In the branch prediction mechanism illustrated in FIG. 5, the branch prediction entries in the branch target buffer 23 are grouped into a number of "sets" consisting of four branch prediction entries each. As illustrated in FIG. 5, the first four branch prediction entries comprise set 1, the second four branch prediction entries comprise set 2, and so on. Each set of branch prediction entries in the branch target buffer 23 is assigned one of the branch pattern tables 33. Thus in the branch prediction mechanism illustrated in FIG. 5, each pattern table is shared by only 4 branch prediction entries.

Figure 6:
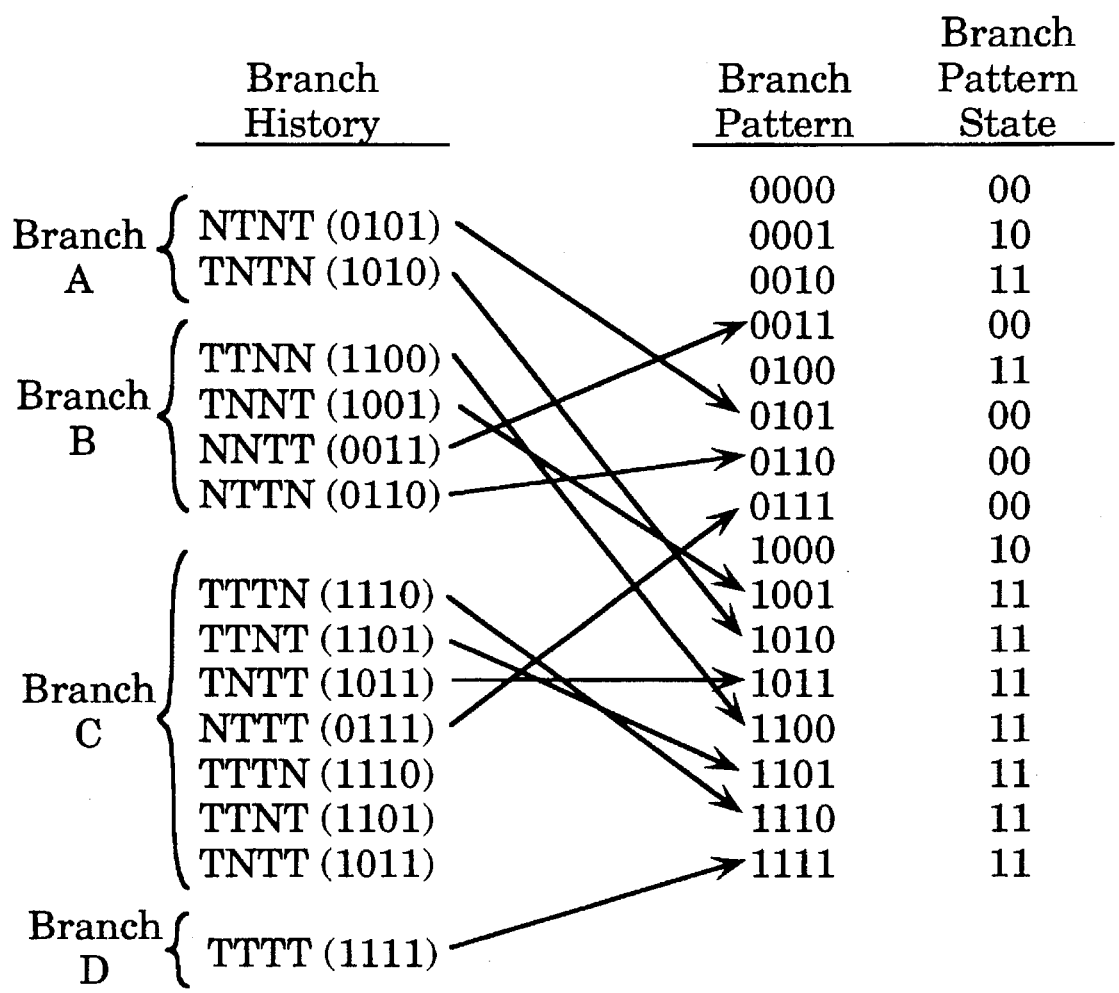
FIG. 6 illustrates an example how four branches can use the same pattern table without interfering with each other.

By reducing the number of branch prediction entries that use a shared pattern table, the amount of interference between branches is reduced and in some cases eliminated. For example, FIG. 6 illustrates how four different branch patterns might use the sixteen entry branch pattern table 23 without any interference. Branch A exhibits an alternating taken/not-taken pattern. Therefore Branch A will only use the pattern table entries corresponding to NTNT and TNTN. Branch B is taken twice in a row and then not-taken twice in a row. Branch B will therefore use the TTNN, TNNT, NNTT, and NTTN entries in the pattern table. Branch C is usually taken, but is not-taken every third occurrence. Branch C therefore uses the TTTN, TTNT, TNTT, NTTT pattern table entries. Finally Branch D is always taken, so Branch D only uses the TTTT pattern table entry. Thus, as illustrated in FIG. 6, these branch patterns do not interfere with one another at all.

Branch Target Buffer with per-Memory Block Pattern Tables

To improve efficiency, some instruction fetch units operate by fetching small blocks of memory during each clock cycle instead of individual processor instructions. In such systems, the branch prediction mechanism must determine which memory block should be fetch next based upon the current memory block.

Figure 7:
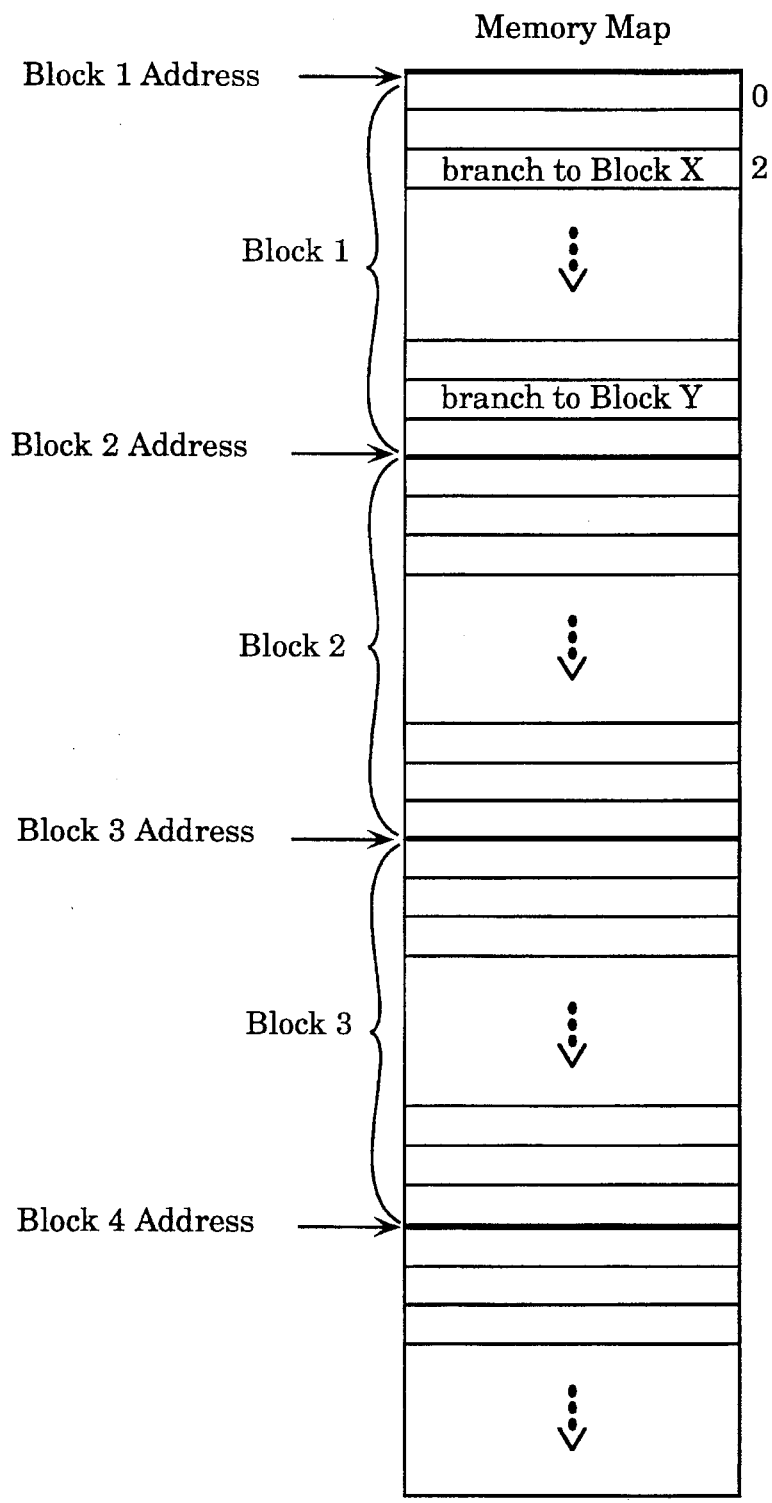
FIG. 7 illustrates a memory map of a memory address space that has been divided into small memory blocks.

For example, referring to FIG. 7, a computer memory map is illustrated. In the memory map of FIG. 7, the memory address space is divided into small memory blocks. Each of the small memory blocks has a block address. Therefore, to implement a branch prediction mechanism for a system that fetches memory blocks, the branch prediction mechanism must provide a prediction of the next memory block to fetch based upon the current memory block.

However, there may be more than one branch instruction in each memory block. Referring again to FIG. 7, two branch instructions are shown in memory block 1. The first branch instruction branches to memory block X and the second branch instruction branches to memory block Y. If the first branch is taken, memory block X must be fetched. If the first branch is not taken and the second branch is taken, memory block Y must be fetched. If neither the first branch nor the second branch is taken, memory block 2 must be fetched as the next sequential memory block. Therefore, to correctly fetch the next memory block, the branch prediction mechanism must fetch the target memory block of the first taken branch instruction in the current memory block or else fetch the next sequential memory block if no branches are predicted taken.

To implement an efficient branch prediction mechanism for systems that fetch blocks of memory, the present invention groups all the branch predictions from the same memory block together into a single "set" of branch predictions such that all the branch predictions can be read with a single branch target buffer access. The present invention accomplishes this implementing the branch target buffer similar to a set-associative cache. In branch target buffer of the present invention not all the branch entries in a particular set must be from the same memory block, however, all the branch prediction entries from a single memory block must be found in the same set.

FIG. 8a illustrates a branch target buffer entry for a system that operates on memory blocks. The branch target buffer entry of FIG. 8a consists of four individual branch prediction entries. The four branch prediction entries belong to the same set as defined by the address of the branches. FIG. 8b illustrates the contents of each branch prediction for the branch target buffer entry illustrated in FIG. 8a. Each branch prediction entry consists of a set address tag, an offset, a precalculated branch prediction, branch history, a valid bit, a target block address tag, and other miscellaneous bits.

The set address tag within the branch prediction entry identifies the particular memory block within the main memory with which the branch prediction entry is associated. This set address tag field is required since, as previously stated, predictions from different memory blocks may appear within the same set of branch predictions. The Offset value in FIG. 8b indicates the byte offset of the particular branch instruction from the memory block address. For example, referring back to FIG. 7, the first branch instruction in memory block 1 would have an offset of 2 since it is 2 bytes from the beginning of the memory block address. The offset is used to sequentially examine the branches in each memory block.

The precalculated prediction in FIG. 8b is the actual taken or not-taken branch prediction for the current branch pattern history. The prediction is calculated using the pattern history table whenever the branch history is updated. By calculating the prediction at the time when the branch history is updated, the time required to make a branch prediction is reduced from 2 cycles to 1 cycle since only one table look up is required.

The branch history in FIG. 8b maintains the taken or not-taken history for the particular branch. The branch history is used to index into a pattern state table when calculating a branch prediction.

The target block address tag field in FIG. 8b stores the address of the memory block that should be fetched if the branch prediction mechanism predicts the branch will be taken.

To minimize the branch pattern table interference, a branch pattern table is provided for each set of branch prediction entries as disclosed in the previous section. Thus each branch target buffer entry as illustrated in FIG. 8a is provided with its own branch pattern table since the branch target buffer entry illustrated in FIG. 8a comprises an entire "set" of predictions.

When a branch prediction must be made for a particular memory block, the branch prediction mechanism of the present invention reads out an entire set of branch predictions, as illustrated in FIG. 8a, such that the branch prediction mechanism obtains all four branch prediction entries in the set. The branch prediction mechanism then examines branch predictions in the set that are associated with the current memory block as indicated by the set address tag. From the branch predictions associated with the current memory block, the branch prediction mechanism selects the taken branch prediction with the lowest offset value. In this manner, the branch prediction mechanism selects the "first" taken branch prediction. If none of the branch predictions associated with the current memory block are taken, then the branch prediction mechanism predicts a fall-through to the subsequent memory block.

In order to quickly access a branch target buffer entry containing its set of branch predictions along with the set's associated branch pattern table, the two units can be concatenated into a single buffer line. FIG. 9 illustrates a branch target buffer where the set of branch predictions and the branch pattern table have been combined into a single branch target buffer entry. Therefore, when the branch prediction mechanism must make a prediction for a particular memory block, the branch prediction mechanism can read out all the necessary information in a single step.

Figure 10:
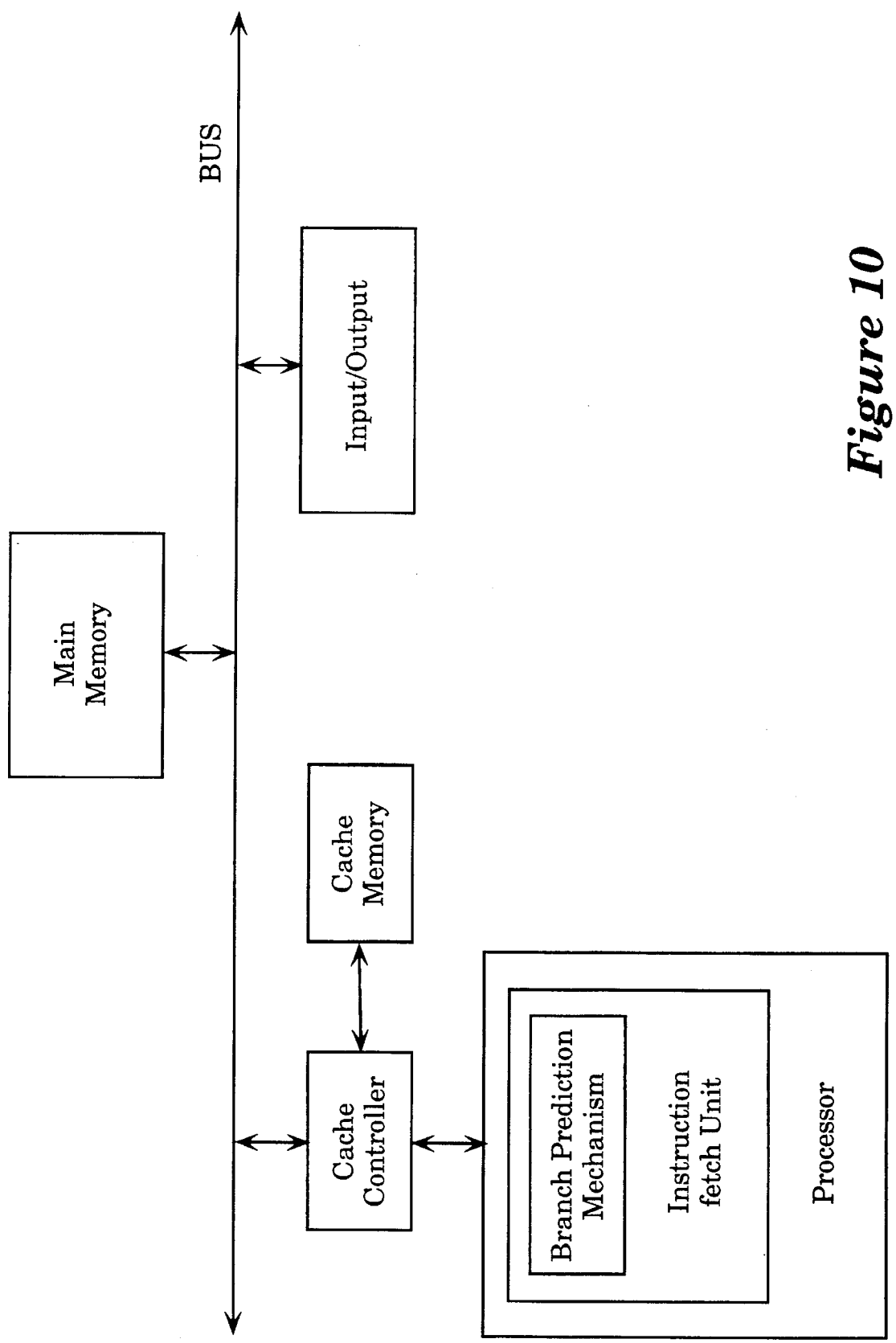
FIG. 10 illustrates a block diagram of a computer system incorporating the branch target buffer of the present invention.

FIG. 10 illustrates the present invention as used in a typical computer system. The present invention comprises a branch prediction apparatus located within a processor. The branch prediction apparatus is used to fetch the proper instructions for the processor from the cache memory or the main memory.

The foregoing has described a branch prediction mechanism with a branch target buffer divided into sets of branch prediction entries wherein each set of branch prediction entries has a shared pattern table. It is contemplated that changes and modifications may be made by one of ordinary skill in the art, to the materials and arrangements of elements of the present invention without departing from the scope of the invention.

We claim:

1. In a computer processor, said computer processor coupled to a memory, a branch prediction apparatus for predicting a stream of processor instructions to fetch, said branch prediction apparatus comprising the elements of:

a branch target buffer comprising M branch prediction entries, each of said branch prediction entries comprising
a target address tag, said target address tag specifying a target address for said branch prediction entry, and
a K bit branch history, said K bit branch history comprising a series of K bits used as an index into a branch pattern table,
a precalculated prediction bit, said precalculated prediction bit based upon said K bit branch history;

said M branch prediction entries divided into N sets of branch prediction entries wherein N is less than M; and N branch pattern tables, each of said N branch pattern tables associated with one of said N sets of branch prediction entries such that each branch prediction entry shares one of said N branch pattern tables with other branch prediction entries in the same set.

2. The branch prediction apparatus as claimed in claim 1, wherein said branch prediction apparatus predicts said stream of processor instructions by predicting a subsequent memory block to be fetched.

3. The branch prediction apparatus as claimed in claim 2, wherein each set of branch prediction entries are grouped together into a single branch target buffer row such that said branch target buffer comprises N rows wherein each branch target buffer row comprises a set of M divided by N branch prediction entries.

4. The branch prediction apparatus as claimed in claim 3, wherein each said branch pattern table associated with each of said N branch target buffer entries is concatenated to said branch target buffer row.

5. In a computer processor, said computer processor coupled to a memory containing processor instructions, a method for predicting a stream of processor instructions to fetch, said method comprising the steps of:

constructing a branch target buffer, said branch target buffer comprising M branch prediction entries, each of said branch prediction entries comprising a target address tag, said target address tag specifying a target address for said branch prediction entry, and a K bit branch history, said K bit branch history comprising a series of K bits used as an index into a branch pattern table;

a precalculated prediction bit, said precalculated prediction bit based upon said K bit branch history; dividing said M branch prediction entries into N sets of branch prediction entries wherein N is less than M; and appending a branch pattern table to each set of branch prediction entries such that each branch prediction entry within a set shares a branch pattern table with the other branch prediction entries in the same set.

6. The method for predicting a stream of processor instructions to fetch as claimed in claim 5, wherein said method predicts said stream of processor instructions to fetch by predicting a subsequent memory block to be fetched.

7. The method for predicting a stream of processor instructions to fetch as claimed in claim 6, wherein each set of branch predictions entries are grouped together into a single branch target buffer row such that said branch target buffer comprises N rows wherein each branch target buffer row comprises a set of M divided by N branch predictions entries.

8. The method for predicting a stream of processor instructions to fetch as claimed in claim 7, wherein each of said branch pattern tables associated with each of said N branch target buffer sets is concatenated to said branch target buffer row.

9. In a computer processor, said computer processor coupled to a memory, a branch prediction apparatus for predicting a stream of processor instructions to fetch, said branch prediction apparatus comprising the elements of:

a branch target buffer comprising S branch prediction sets, each of said branch prediction sets comprising E branch prediction entries wherein each branch prediction entry contains a precalculated prediction bit for making a branch prediction, S branch pattern tables, each of said S branch pattern tables associated with one of said S branch prediction sets such that each branch prediction set has an associated branch pattern table, wherein each branch prediction entry shares one of said S branch pattern tables with other branch prediction entries in the same set.

10. The branch prediction apparatus as claimed in claim 9, wherein each branch prediction entry further comprises:

a target address tag, said target address tag specifying a target address for said branch prediction entry, and a K bit branch history, said K bit branch history comprising a series of K bits used as an index into said branch pattern table associated with the branch prediction set that said branch prediction entry is in.

* * * * *

UNITED STATES PATENT AND TRADEMARK OFFICE
CERTIFICATE OF CORRECTION

PATENT NO. : 5,577,217
DATED : November 19, 1996
INVENTOR(S) : Hoyt et al.

It is certified that error appears in the above-indentified patent and that said Letters Patent is hereby corrected as shown below:

In column 3 at line 10 following descriptions and prior to "and" delete "."

In column 7 at line 10 delete "nottaken" and insert --not taken--

In column 7 at line 52 delete "the-branches" and insert --the branches

Signed and Sealed this

Thirteenth Day of May, 1997

BRUCE LEHMAN

Attest:

Attesting Officer

Commissioner of Patents and Trademarks